Patented Oct. 28, 1941

2,260,445

UNITED STATES PATENT OFFICE 2,260,445

METHOD OF PRODUCING LIGHT-SENSITIVE LAYERS

Evert Ragnar Elvegård, Stockholm, Sweden

No Drawing. Application March 16, 1938, Serial No. 196,287. In Sweden February 11, 1938

1 Claim. (Cl. 95—7)

It is known to produce light-sensitive layers using cellulose as a suspension agent by successively bathing certain cellulose foils, for example, foils obtained by the regeneration of cellulose from an aqueous solution of cellulose xanthogenate, so-called viscose foils, in a series of solutions, containing substances, which after chemical reaction with each other give a precipitate of light-sensitive substances in the layer. As examples of such substances may be mentioned silver nitrate and potassium bromide, which together give light-sensitive silver bromide; certain organic compounds, for example, diazo compounds and azo compounds may also be used.

Yet, films hitherto produced in this manner have the tendency to give a dense fog, which, in a substantial degree, reduces their usefulness for photographic purposes.

The present invention relates to a method of removing this drawback so that layers produced according to the invention give clear and fogless photographic pictures.

It has proved that the formation of fog may be prevented if free bromine or free hydrobromic acid exist in a bath, with which the layer is treated after the treatment with a solution of a silver salt. It appears as if the soluble silver salts absorbed by the layer when bathed in a solution containing the same are adsorbed in such a high degree to the suspending agent that they are not completely converted into insoluble silver halide during a subsequent reaction with halides. The part of the soluble silver salts thus remaining is later reduced during the developing process into silver, which causes the fog. In order to provide for a complete converting of the soluble silver salts, with which the layer has been impregnated a more effective attack is required on the adsorbed silver salts than what can be obtained by a halide. Such effective agents are, according to the invention, free bromine or free hydrobromic acid.

As an example of carrying out the invention may be mentioned the precipitation of silver bromide within a viscose foil. In such a case the foil may be first bathed in, for example, a 0.1 molar solution of silver nitrate for a certain length of time, for example, one minute, and after that for a certain length of time, for example, 5 minutes, in one of the following solutions:

(1) 0.1 molar solution of bromine;
(2) 0.2 molar hydrobromic acid;
(3) 0.1 molar potassium bromide +0.05 molar bromine;
(4) 0.5 molar potassium bromide +0.1 molar nitric acid. Yet, before being used this solution must be boiled or be aged at room temperature for a few days, in which case free bromine is liberated in the solution.

The free bromine or hydrobromic acid need not necessarily be used in solution. They may also be added to the layer in the form of gas or vapor. Likewise, it is not necessary to cause the substances reacting with each other, to react by successive treatment, for example, bathing of the layers in solutions of the substances. It is possible also to bring them together in one and the same operation, the layer being provided as a permeable partition between two departments of a container, in which the solutions in question are. The dissolved salts will then travel into the layer from both sides and react with each other there. Electric current may also be used for assisting such travelling.

The light-sensitive layers produced according to the invention may be sensitized by using methods or substances generally used for sensitizing photographic material. Thus, the light sensitivity may be increased, if the layer is subjected to a treatment in heat or with alkaline agents for example, with a solution of ammonia or an organic amine. Also, an increase of sensitivity is obtained if sulphur-containing sensitizers, for example, thiosinamine, are added to the layer. Also treatment with silver nitrate, which is often used when making ordinary photographic film hypersensitive, may be applied with advantage to light-sensitive layers produced in accordance with the invention.

In a similar manner the layers may be sensitized for other regions of the spectrum than those of the silver salts by optic sensitizing with substances generally used for this purpose, such as cyanines, phthaleines and the like.

For the rest, the foils may be subjected to all treatments customary in the production of common photographic film with gelatine emulsion. The method according to the present invention may be used with advantage in combination with the invention forming the object of a simultaneously filed application.

Having now described my invention, what I claim as new and desire to secure by Letters Patent is:

In a method of making a light-sensitive layer having a regenerated cellulose foil as a suspension agent by treating the layer with soluble silver salts and with halides to form a light-sensitive silver halide, the steps comprising treating the layer which has been treated with the silver salt solution with a solution containing free bromine whereby the soluble silver salt adsorbed to the regenerated cellulose foil is completely converted during the formation of the insoluble silver halide thus preventing the formation of fog.

EVERT RAGNAR ELVEGÅRD.